United States Patent Office 3,369,055
Patented Feb. 13, 1968

3,369,055
NITROGENOUS COPOLYMERS
Ival O. Salyer, Dayton, and David Gerald Glasgow, Centerville, Ohio, assignors to Monsanto Research Corporation, St. Louis, Mo., a corporation of Delaware
No Drawing. Filed Dec. 6, 1965, Ser. No. 512,024
9 Claims. (Cl. 260—830)

The invention described herein was made in the course of, or under, a contract with the U.S. Atomic Energy Commission.

This invention relates to nitrogenous polymers and provides highly thermally stable, high-molecular weight copolymers containing a plurality of dicarboximide and ether linkages, which polymers are useful in the plastics, laminate and coatings industries. More particularly, the invention provides solid polymeric products prepared from a mixture consisting essentially of an N,N'-bridged bis-(epoxycyclohexanedicarboximide), an epoxycycloalkyl ether, and a diamine.

In our copending applications Ser. Nos. 512,027 and 512,028, filed of even date, there is disclosed the preparation of certain N,N'-bridged bis(cyclohexene-1,2-dicarboximides) by reaction of a cyclohexenedicarboxylic anhydride with a diamine substantially according to the scheme:

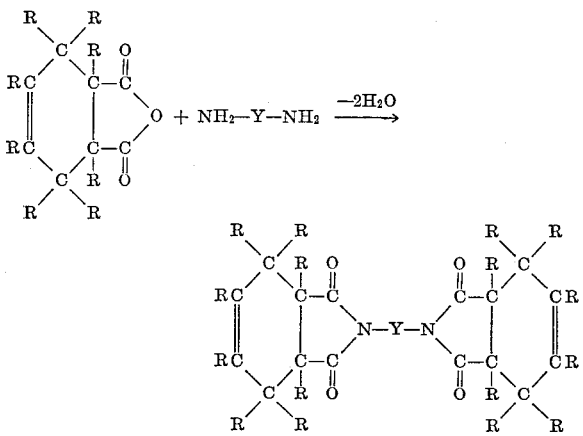

wherein R is hydrogen or a hydrocarbon alkyl radical of from 1 to 5 carbon atoms and Y is a hydrocarbylene or a hydrocarbyleneoxyhydrocarbylene radical which is free of olefinic and acetylenic unsaturation and contains from 2 to 12 carbon atoms. Examples of the useful anhydrides are 4-cyclohexene-1,2-dicarboxylic anhydride, 3,3-dipentyl-4-cyclohexene-1,2-dicarboxylic anhydride, 4-ethyl-4-cyclohexene-1,2-dicarboxylic anhydride, 3,4,5,6-tetramethyl-4-cyclohexenedicarboxylic anhydride, etc. The diamines may be aliphatic or aromatic and include, e.g., o-, m- or p-phenylenediamine, ethylene diamine, 1,10-dodecanediamine, cyclohexanediamine, 2,7-naphthalenediamine, toluene-2,3-diamine, benzidine, 4,4'-oxydianiline, bis(3-aminopropylether), 4-aminobenzyl 4-aminocyclohexyl ether, etc. When the amines are hydrocarbon diamines, the products are N,N'-hydrocarbylenebis(cyclohexenedicarboximides) or the lower alkyl derivatives thereof. When the diamines contain an oxygen linkage between two hydrocarbylene radicals, the products are N,N'-(oxydihydrocarbylene)-bis(cyclohexene-1,2-dicarboximides) or the lower alkyl derivatives thereof; i.e., —Y— in the above formula can be designated as —hydrocarbylene-O-hydrocarbylene—

Reaction of the anhydride with the amine to give the bis(cyclohexenedicarboximides) according to the reaction scheme shown above proceeds by contacting substantially one mole of the appropriate diamine with substantially two moles of the anhydride in the presence of an inert organic liquid solvent at a temperature of 50 to 150° C.

According to our copending application Ser. No. 512,-027, filed of even date, the bis(cyclohexenedicarboximides) which are obtained as set forth above from the cyclohexenedicarboxylic anhydride and the diamine are converted, by reaction with an organic peracid, to bis-(epoxycyclohexanedicarboximides) of the formula

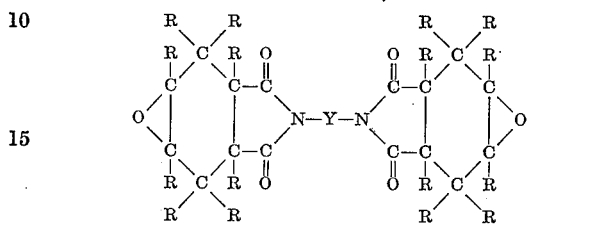

The epoxidation takes place by simply adding an organic peracid, e.g., peracetic, perbenzoic or per-o-, m- or p-chlorobenzoic acid, to the bis(cyclohexenedicarboximide) in the presence of an inert, organic liquid solvent at ordinary or slightly decreased temperature and allowing the resulting mixture to stand until conversion to the epoxide has been completed. A quantity of peracid is used which is sufficient to supply the oxygen required for epoxidation of both of the olefinic bonds of the bis-(cyclohexenedicarboximide).

Starting with 4-cyclohexene-1,2-dicarboxylic anhydride and p-phenylenediamine and epoxidizing the resulting N, N'-phenylenebis(4-cyclohexene-1,2-dicarboximide), there is obtained upon epoxidation with, say, perpropionic acid, the N,N'-phenylenebis(4,5-epoxycyclohexane - 1,2 - dicarboximide) of the formula

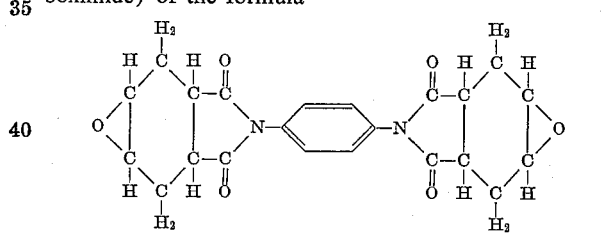

Using 4,4'-oxydianiline, the product after epoxidation is N,N'-(oxydi-p-phenylene)bis(4,5-epoxycyclohexane-1,2-dicarboximide) of the formula

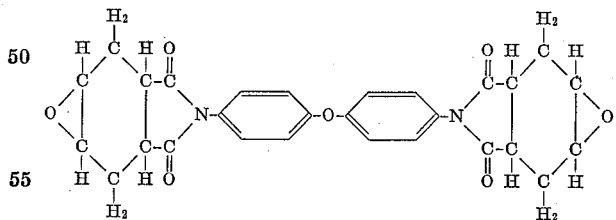

Whether the N,N'-bridging is hydrocarbylene or hydrocarbyleneoxyhydrocarbylene, the epoxy compounds are of interest in that upon heating them at from, say, 200°–300° C. in the presence or absence of catalysts of polymerization and/or curing agents they are homopolymerized and/or cross-linked to resinous solids of use to the plastics industry.

Now we have found that valuable copolymers are prepared by heating a mixture of (I) an N,N'-bridged bis (4,5 - epoxycyclohexane - 1,2-dicarboximide), wherein the bridging is aromatic; (II) a bis(epoxycycloalkyl) ether having from 5 to 6 carbon atoms in the cycloalkyl ring and a total of from 10 to 16 carbon atoms, e.g., bis(2,3-epoxycyclopentyl) ether, bis(4,5-epoxycyclohexyl) ether, bis(2,3-epoxy-4-methylcyclopentyl) ether, bis(4,5-epoxy- 4-ethylcyclohexyl) ether, bis(2,3-epoxy-5-isopropylcyclopentyl) ether, etc; and (III) an aromatic diamine of the formula $H_2N-X-NH_2$, wherein X is an arylene or an aryleneoxyarylene group attached to the two amino radicals through nuclear carbon, free of olefinic and acetylenic unsaturation, and containing from 6 to 12 carbon atoms, e.g., o-, m- or p-phenylenediamine, benzidine, 2,7-naphthalenediamine, 3,5-toluenediamine, 4,4'-oxydianiline, 7,7' - oxybis(2 - naphthylamine), 4,4' - oxybis(p-biphenylylamine), etc. Heating is conducted at above the melting points of the bis-imide and of the diamine. There are thus produced high molecular weight terpolymers derived from (I) the aromatically N,N'-bridged diepoxy imide:

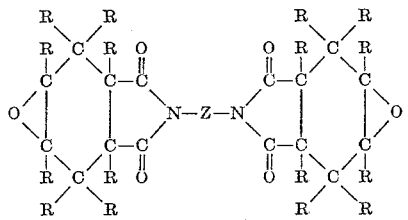

in which Z is a hydrocarbon arylene or aryleneoxyarylene radical attached to the two nitrogen atoms through nuclear carbon, free of olefinic and acetylenic unsaturation, and containing from 6 to 12 carbon atoms in the arylene group, and wherein R is hydrogen or a hydrocarbon alkyl radical of from 1 to 5 carbon atoms; (II) the epoxycycloalkyl ether

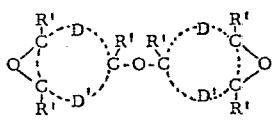

where D and D' are alkylene radicals necessary to complete with the carbon atoms to which they are attached a cycloalkyl ring having from 5 to 6 carbon atoms in the ring and a total of from 5 to 8 carbon atoms and R' is hydrogen or an alkyl radical of from 1 to 5 carbon atoms, and (III) said aromatic diamine, $H_2N-X-NH_2$. Although the structure of the terpolymers is not definitely known, it is believed that the copolymer consists of a chain having bis-imide and ether units cross-linked by the diamine.

The three reactants, i.e., the bis-imide, the ether and the diamine may be used in any proportion, depending upon the quantity of ether-derived units it is desired to have in the polymer chain and the amount of cross-linking. The ether-derived units appear to have a flexibilizing effect on the polymer; at the same time, they tend to lower thermal-resistivity. The cross-linking diamine has a "curing" or hardening effect. Although the epoxycycloalkyl ethers and the diamines produce their respective effects even when present in very small concentrations, for most purposes it is recommended that the bis-imide, the ether and the diamine be present in a molar proportion of at least 1.0:0.1:0.1; i.e., there is present at least 0.1 mole of the ether compound and 0.1 mole of the diamine per mole of the bis-imide. Also, although the polymer chain may consist almost entirely of units derived from the epoxycycloalkyl ether, and although such high-ether content chains may be cross-linked at every unit by the diamine, for simultaneous retention of thermal stability and toughness, it is advantageous to maintain the molar ratio of the reactants to not more than 4 moles of the epoxycycloalkyl ether and 4 moles of the diamine per mole of the bis-imide. In practical operation, for some applications, such high content of the ether and the diamine are inadvisable owing to the possibility of vigorous and hence heterogenous reaction. Too rapid a set is to be avoided, e.g., in the production of cast moldings and laminates whereby bubbles and uneven adhesion may result. Generally, it is therefore preferred to maintain a bis-imide/epoxycycloalkyl ether molar ratio of from 1.0:0.5 to 1.0:3.0. The quantity of diamine employed is preferably from, say 25% to 75% of the total of bis-imide and epoxycycloalkyl ether on a molar basis.

For the production of castings, the three components are simply mixed together in the appropriate quantities and the mixture is heated in the mold until liquefaction and subsequent hardening has occurred. Advantageously, the mixture may be heated to obtain thorough solution, with resulting intimate contact of the components, and the free-flowing solution or melt is poured into the mold. Castings thus obtained are transparent, substantially colorless, tough products which are characterized by very good resistance to heat, moisture and to attack by chemicals. The same procedure is useful for potting of electrical components or for encapsulating materials and devices which are to be protected from stringent environments. In laminating, either the well ground mixture of the components, or the solution or melt, is applied to plies which are stacked and compression molded at, say, from 50 to 1500 p.s.i. at a temperature of up to 200° C., gradually releasing the pressure and then curing at, say, about 200° to 300° C. Solutions of the three components in a volatilizable solvent, e.g., dimethylformamide, or melts of the three components are useful as coatings. After applying the solutions or melts to the substrate to be coated, a hard, highly heat-resistant, tenacious coating is formed in situ by heating gradually to about 200° C. and then maintaining the coated substrate at about 200°–300° C. for final cure.

Also, if desired, a prepolymer can be made by heating a mixture of the bis-imide and the cycloalkyl ether at temperatures of from, say, 80° C. to 180° C., the diamine may be added to the prepolymer, and the whole maintained at the 200°–300° C. curing conditions to obtain the hardened copolymer. The preparation of prepolymer is particularly advantageous for purposes of commerce, wherein a two-package item will often be preferred over a three-package commodity.

Preparation of the present copolymers does not require the use of catalysts. However, for some purposes particularly in the production of laminates and other compression molded products a catalyst may be advantageous. Ionic catalysts of polymerization, e.g., complexes of boron trifluoride and lower alkyl amines or alkanols, are useful.

The invention is further illustrated by, but not limited to, the following examples.

*Example 1*

A solution consisting of 255 g. (1.68 mole) of 4-cyclohexene-1,2-dicarboxylic anhydride in 750 ml. of dimethylformamide was heated to reflux. To the refluxing solution there was then added to a solution of 150 g. (0.75 mole) of 4,4'-oxydianiline in 500 ml. of dimethylformamide. The addition was conducted slowly enough to permit continued reflux. The whole was then refluxed for an additional hour, 225 ml. (2.4 mole) of acetic anhydride was added, and refluxing was continued for two more hours. Upon cooling to room temperature, precipitation occurred. Filtration and drying of the precipitate gave 258 g. (73.7% yield) of the N,N'-(oxydi-p-phenylene)bis (4-cyclohexene - 1,2 - dicarboximide). Recrystallization from chloroform/ether gave the substantially pure product, M.P. 235–238° C., and analyzing as follows:

Calcd. for $C_{28}H_{24}N_2O_5$: C, 71.78%; H, 5.16%; N, 5.98%. Found: C, 70.97%; H, 5.90%; N, 5.96%.

Infrared analysis confirmed the structure, showing absorption of the olefinic bond at 1642 cm.$^{-1}$ and 697 cm.$^{-1}$ and of imide at 1785 cm.$^{-1}$ and 1712 cm.$^{-1}$.

The above-obtained, olefinic imide was epoxidized as follows:

To a 5-liter, 4-necked flask, fitted with stirrer, reflux condenser and dropping funnel, there was charged a solution consisting of 232 g. (0.5 mole) of the N,N'-(oxydi-p-phenylene)bis(4-cyclohexene - 1,2 - dicarboximide) in 2 liters of chloroform. The solution was cooled to 4° C. by means of an ice bath and there was gradually added to it, over a 75-minute period, a solution of 232 g. (1.15 mole) of technical m-chloroperbenzoic acid in 1000 ml. of ether, while maintaining the temperature of the reaction mixture at below 7° C. When all of the ether solution had been added, cooling was discontinued, and the reaction mixture was stirred while standing to attain room temperature. Four hours after addition of the peracid had been completed, 500 ml. of 10% aqueous sodium sulfite was added in order to destroy any excess, unconsumed peracid. The whole was then allowed to stratify.

The organic layer which formed was separated and washed with two 500 ml. portions of 10% aqueous potassium carbonate to remove acids and then with two 750 ml. portions of water. The washed product was dried over sodium sulfate, decanted, and evaporated to dryness to give 195.4 g. of crude product. An additional 6.4 g. was obtained by extracting with chloroform the sodium sulfate which had been used as drying agent and then evaporating the chloroform extract to dryness. There was then obtained a total of 201.8 g. (81.5% theoretical yield) of the crude N,N'(oxydi-p-phenylene)bis(4,5-epoxycyclohexane-1,2-dicarboximide). Purification by crystallization from methylene dichloride/ether gave a light beige solid, M.P. 238–239° C., analyzing 5.09% nitrogen as against 5.60%, the calculated value for $C_{28}H_{24}N_2O_7$. Infrared analysis substantiated the structure, showing presence of epoxide at 793 cm.$^{-1}$ and of imide at 1785 cm.$^{-1}$ and 1713 cm.$^{-1}$.

The thus purified N,N' - (oxydi-p-phenylene)bis(4,5-epoxycyclohexane-1,2-dicarboximide) was mixed with bis(2,3-epoxycyclopentyl) ether (described in the Phillips et al. U.S. Patent No. 2,973,373) and m-phenylenediamine in a 1:1:1 molar ratio. The mixture was brought to clear solution by heating it on the oil bath to 180° C. Some of the clear solution was poured into a Teflon mold and cured at 200°–220° C. in a forced air oven for about 20 hours. Upon cooling, the cured product was readily removed from the mold. It was a hard, tough, clear well-dimensioned molded piece having a heat-distortion point of 266.5° C.

Another portion of the clear solution obtained above was applied to 4″ squares of unsized glass fiber textiles and these were stacked into a 6-ply assembly. Compression molding at about 190° C./300 p.s.i. and curing at 220° C. gave a tough, tenaciously bonded composite.

*Example 2*

A 1:2:1.5 molar mixture of the N,N'-(oxydi-p-phenylene)bis(4,5-epoxycyclohexane-1,2-dicarboximide) of Example 1, bis(2,3-epoxycyclopentyl) ether and m-phenylenediamine was heated to 120° C. to obtain a clear solution. This was poured into a Teflon mold and cured by heating at 200°–220° C. in a forced air oven for 18–20 hours. Upon cooling there was obtained a well-dimensioned clear, colorless molded piece which resembled the cured product prepared in Example 1. However, the heat distortion temperature was lower, being 249° C. The lower heat distortion point undoubtedly reflects the replacement in the polymer chain of some of the rigidity-imparting imide units by the flexibility-imparting cyclopentyl ether units.

Substantially the same results are obtained by replacing the N,N'-(oxydi-p-phenylene)bis(4,5 - epoxycyclohexane-1,2-dicarboximide) of the above examples with an N,N'-arylenebis(4,5-epoxycyclohexanedicarboximide), e.g., one in which said arylene radical is phenylene or biphenylylene. Bis(epoxycyclohexyl) ether may be used instead of the cyclopentyl compound. The presence or absence of alkyl substituents at the cycloalkyl groups of either the bis-imide or the epoxycycloalkyl ether has little, if any, effect. Also, instead of using phenylenediamine in the three component mix, there may be used other arylenediamines, e.g., benzidine or the oxygen-containing diamines such as 4,4'-oxydianiline.

The presently provided process and the polymers obtained thereby are suitable for the coatings of metals, generally, siliceous materials including the ceramics and glasses, and carbonaceous materials such as graphite. They are likewise useful as adhesives for such materials and in the production of laminates wherein fibrous products, e.g., cellulosic, metal, glass, silica or boron fibers or textiles are compression molded in contact with the mix of epoxy compounds and diamine.

Obviously, many modifications and variations of the invention may be made without departing from the spirit and scope thereof, and therefore only such limitations should be imposed as are set forth in the appended claims.

What is claimed:

1. The solid polymeric product obtained by heating a mixture consisting essentially of (I) a bis-imide of the formula

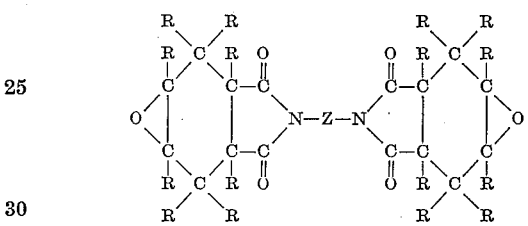

in which Z is a hydrocarbon arylene or aryleneoxyarylene radical attached to the nitrogen atoms through nuclear carbon, free of olefinic and acetylenic unsaturation and containing from 6 to 12 carbon atoms in the arylene group, and wherein R is hydrogen or a hydrocarbon alkyl radical of from 1 to 5 carbon atoms, (II) an ether compound of the formula

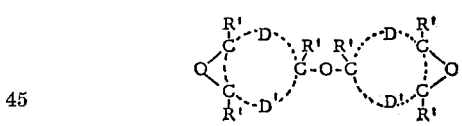

wherein R' is hydrogen or an alkyl radical of from 1 to 5 carbon atoms and D and D' are alkylene radicals necessary to complete, with the carbon atoms to which they are attached, a cycloalkyl radical having from 5 to 6 carbon atoms in the ring and a total of from 5 to 8 carbon atoms, and wherein the epoxide oxygen atoms are attached to adjacent carbon atoms in the rings and (III) a diamine of the formula $H_2N-X-NH_2$ wherein X is an arylene or an aryleneoxyarylene radical attached to the two amino radicals through nuclear carbon, free of olefinic and acetylenic unsaturation, and containing from 6 to 12 carbon atoms in the arylene group at above the melting points of the bis-imide and of the diamine but below 300° C.

2. The product defined in claim 1, further limited in that the mixture consists at least of 0.1 mole of the ether compound and of 0.1 mole of the diamine per mole of the bis-imide.

3. The product defined in claim 1, further limited in that R is hydrogen.

4. The product defined in claim 1, further limited in that Z is aryleneoxyarylene.

5. The product defined in claim 1, further limited in that Z is phenyleneoxyphenylene.

6. The product defined in claim 1, further limited in that R' is hydrogen and D and D' are each —$CH_2$—.

7. The product defined in claim 1, further limited in that X is arylene.

8. The product defined in claim 1, further limited in that R and R' are each hydrogen, Z is aryleneoxyarylene, D and D' are each —$CH_2$— and X is arylene.

9. The product defined in claim 1, further limited in that R and R' are each hydrogen, Z is phenyleneoxyphenylene, D and D' are each —$CH_2$— and X is phenylene.

References Cited

UNITED STATES PATENTS 2,935,488   5/1960   Phillips et al. _____ 260—830

WILLIAM H. SHORT, *Primary Examiner.*

T. KERWIN, *Assistant Examiner.*